United States Patent
Horng et al.

(10) Patent No.: US 10,679,043 B2
(45) Date of Patent: Jun. 9, 2020

(54) 3-D PATH DETECTION SYSTEM FOR HAND GESTURE RECOGNITION APPLICATION

(71) Applicant: NATIONAL SUN YAT-SEN UNIVERSITY, Kaohsiung (TW)

(72) Inventors: Tzyy-Sheng Horng, Kaohsiung (TW); Chia-Hung Yeh, Kaohsiung (TW); Fu-Kang Wang, Kaohsiung (TW); Mu-Cyun Tang, Kaohsiung (TW); Chien-Lun Chen, Kaohsiung (TW); Min-Hui Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 157 days.

(21) Appl. No.: 15/871,230

(22) Filed: Jan. 15, 2018

(65) Prior Publication Data
US 2018/0357474 A1    Dec. 13, 2018

(30) Foreign Application Priority Data
Jun. 7, 2017   (TW) .............................. 106118953 A (51) Int. Cl.
*G06K 9/00* (2006.01)
*G01S 13/86* (2006.01)
(Continued)

(52) U.S. Cl.
CPC .......... *G06K 9/00342* (2013.01); *G01S 7/415* (2013.01); *G01S 13/867* (2013.01);
(Continued)

(58) Field of Classification Search
None
See application file for complete search history.

(56) References Cited

U.S. PATENT DOCUMENTS

| 8,258,453 B2 | 9/2012 | Rees |
| 2012/0249741 A1 | 10/2012 | Maciocci et al. |

(Continued)

FOREIGN PATENT DOCUMENTS

| TW | 200707257 A | 2/2007 |
| TW | 201428346 A | 7/2014 |
| WO | 2012055148 A1 | 5/2012 |

OTHER PUBLICATIONS

Tang et al ("Human gesture sensor using ambient wireless signals based on passive radar technology" *2015 IEEE MTT-S International Microwave Symposium*, pp. 1-4, Jul. 27, 2015). (Year: 2015).*

(Continued)

*Primary Examiner* — Leon Viet Q Nguyen
(74) *Attorney, Agent, or Firm* — Demian K. Jackson; Jackson IPG PLLC (57) ABSTRACT

A 3-D path detection system includes an image capture device, a radar device and a computing module. The image capture device is provided to produce a dynamic image for calculating the x- and y-direction (transverse) pixel-value displacements according to a captured moving object image. The radar device is configured to transmit an input wireless signal to a moving object and receive a reflection signal from the moving object, and is configured to calculate a z-direction (longitudinal) displacement of the moving object according to a Doppler shift in the reflection signal. The computing module is configured to construct a 3-D path of the moving object according to the x- and y-direction pixel-value displacements of the moving object image and the z-direction displacement of the moving object.

10 Claims, 6 Drawing Sheets

(51) Int. Cl.
*G06T 7/254* (2017.01)
*G01S 7/41* (2006.01)

(52) U.S. Cl.
CPC .......... *G06K 9/00355* (2013.01); *G06T 7/254* (2017.01); *G06T 2207/10016* (2013.01); *G06T 2207/30196* (2013.01); *G06T 2207/30241* (2013.01)

(56) References Cited

U.S. PATENT DOCUMENTS

2016/0259037 A1* 9/2016 Molchanov ........... G01S 13/584
2018/0293739 A1* 10/2018 Gupta .................. G06K 9/6256

OTHER PUBLICATIONS

Mu-Cyun Tang et al., A Hybrid Computer Vision and Wi-Fi Doppler Radar System for Capturing the 3-D Hand Gesture Trajectory with a Smartphone, International Microwave Symposium 2017, Jun. 7, 2017.

Taiwanese Office Action dated Feb. 22, 2018 for Taiwanese Patent Application No. 106118953, 5 pages.

* cited by examiner

3-D PATH DETECTION SYSTEM FOR HAND GESTURE RECOGNITION APPLICATION

FIELD OF THE INVENTION

This invention generally relates to a 3-D path detection system, and more particularly to a 3-D path detection system that combines the computer vision and Doppler radar technologies for hand gesture recognition application.

BACKGROUND OF THE INVENTION

Recently, augmented reality (AR) is gaining increasing attention for use in mobile phones, and hand gesture recognition (HGR) is considered as an important interaction technique in the mobile AR applications. By using HGR technology, users can directly see the interaction with the virtual image in the mobile phone's display. The mainstream technologies for HGR are based on 3-D cameras such as Microsoft Kinect, Intel RealSense and Leap Motion. In a 3-D camera, RGB and infrared (IR) cameras are used to produce images and their depth information, respectively, for HGR. However, the mobile phone equipped with an extra IR camera has the disadvantages of extra cost and greater power/resource consumption. Additionally, the IR cameras function poorly outdoors or in bright light. These disadvantages of IR cameras restrict the evolution of HGR in mobile phones.

SUMMARY

The primary object of the present invention is to utilize an image capture device to produce dynamic images of a moving object for extracting the x- and y-direction (transverse) pixel-value displacements from a captured moving object image, utilize a radar device to detect the z-direction (longitudinal) displacement of the moving object, and utilize a computing module to construct a 3-D path of the moving object according to the obtained x- and y-direction pixel-value and z-direction displacements.

The 3-D path detection system of the present invention includes an image capture device, a radar device and a computing module. The image capture device is configured to produce dynamic images of a moving object, and is configured to extract an x-direction (transverse horizontal) pixel-value displacement and a y-direction (transverse vertical) pixel-value displacement from a captured moving object image. The radar device is configured to transmit a wireless signal input from a wireless communication device to the moving object and receive a reflection signal from the moving object, and is configured to detect a z-direction displacement of the moving object according to a Doppler shift in the reflection signal. The computing module is coupled to the image capture device and the radar device, and is configured to construct a 3-D path of the moving object using the results of the x- and y-direction pixel-value and z-direction displacements.

The 3-D path detection system of the present invention utilizes the image capture device to obtain the x- and y-direction pixel-value displacements of the moving object image and utilizes the radar device to obtain the z-direction displacement of the moving object, such that the computing module can construct the 3-D path of the moving object according to the obtained x- and y-direction pixel-value and z-direction displacements. The radar device does not have its own RF signal source, but uses the wireless signal input from the wireless communication device to detect the z-direction displacement of the moving object. Therefore, the interference issue between the radar device and the wireless communication device can be avoided. The present invention can be used on mobile phones to carry out HGR without extra IR camera and RF signal source and therefore has the advantages of lower computation resources and power consumption than the 3-D camera technology. In addition, the radar device using the wireless signal to detect the moving object will not be affected by outdoor use or bright light. For these reasons the 3-D path detection system of the present invention can improve the popularity of HGR application in mobile phones.

DETAILED DESCRIPTION OF THE INVENTION

Figure 1:
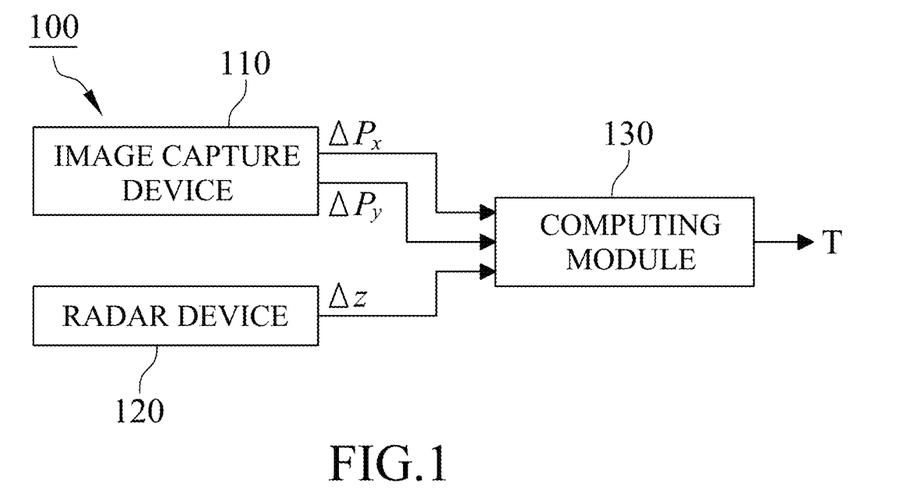
FIG. 1 is a functional block diagram illustrating a 3-D path detection system in accordance with one embodiment of the present invention.

With reference to FIG. 1, it is a functional block diagram of a 3-D path detection system 100 in one embodiment of the present invention. The 3-D path detection system 100 includes an image capture device 110, a radar device 120 and a computing module 130. The image capture device 110 and the radar device 120 are coupled to the computing module 130, and the image capture device 110, the radar device 120 and the computing module 130 are non-integrated electronic products in this embodiment. However, they can be integrated in a mobile phone in other embodiments.

Figure 2:
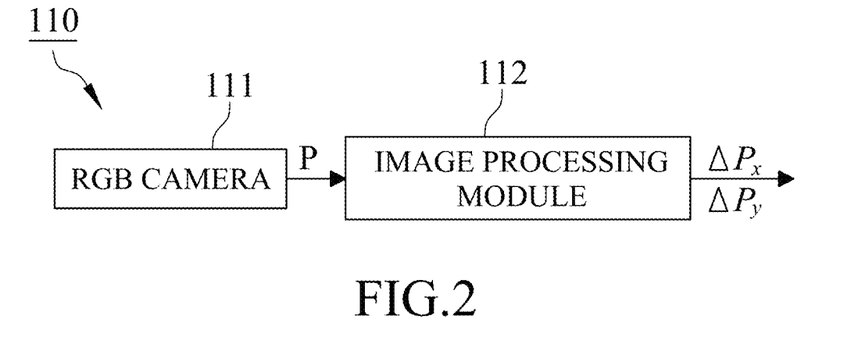
FIG. 2 is a functional block diagram illustrating an image capture device in accordance with one embodiment of the present invention.
Figure 3:
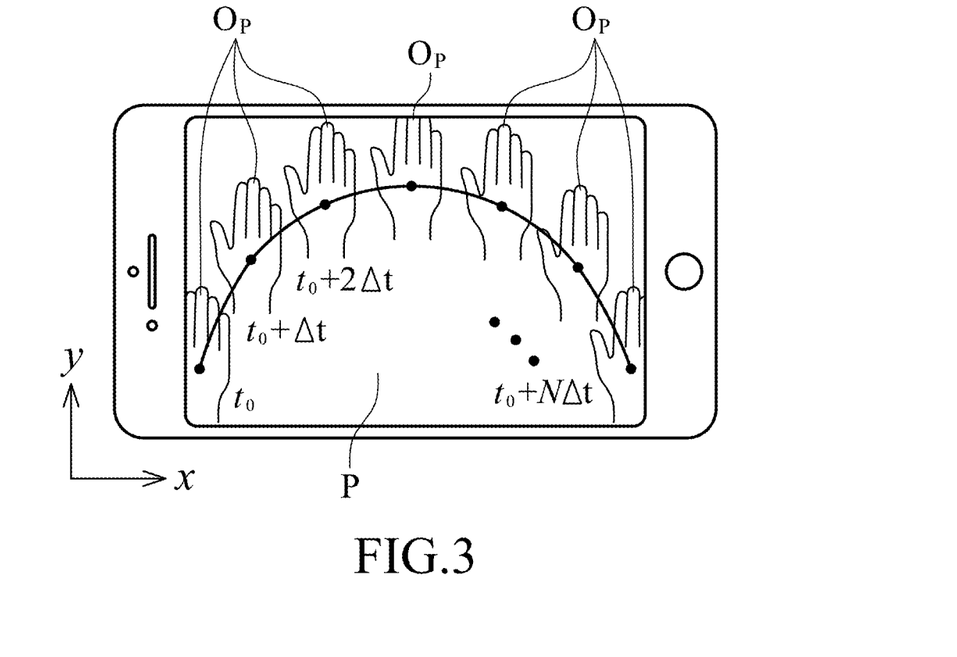
FIG. 3 is a schematic diagram illustrating a mobile phone producing a dynamic image in accordance with one embodiment of the present invention.

With reference to FIGS. 2 and 3, the image capture device 110 includes an RGB camera 111 and an image processing module 112. The RGB camera 111 produces a dynamic image P, which is viewed as a moving object image $O_P$ with a background. In FIG. 3, the moving object image $O_P$ represents a user's hand moving along an arc path in this embodiment. And the moving object image $O_P$ may represent different moving objects in other embodiments. Referring FIG. 2, the image processing module 112 of the image capture device 110 receives the dynamic image P from the RGB camera 111 and then performs a background subtraction to compute an x-direction (transverse horizontal) pixel-value displacement $\Delta P_x$ and a y-direction (transverse vertical) pixel-value displacement $\Delta P_y$ according to the moving object image $O_P$. In this embodiment, the image processing module 112 of the image capture device 110 establishes a background model related to the dynamic image P to compare the differences in pixels between the dynamic image P and the background model for capturing the moving object image $O_P$. The background mode is, but not limited to, a Gaussian mixture model.

Figure 4:
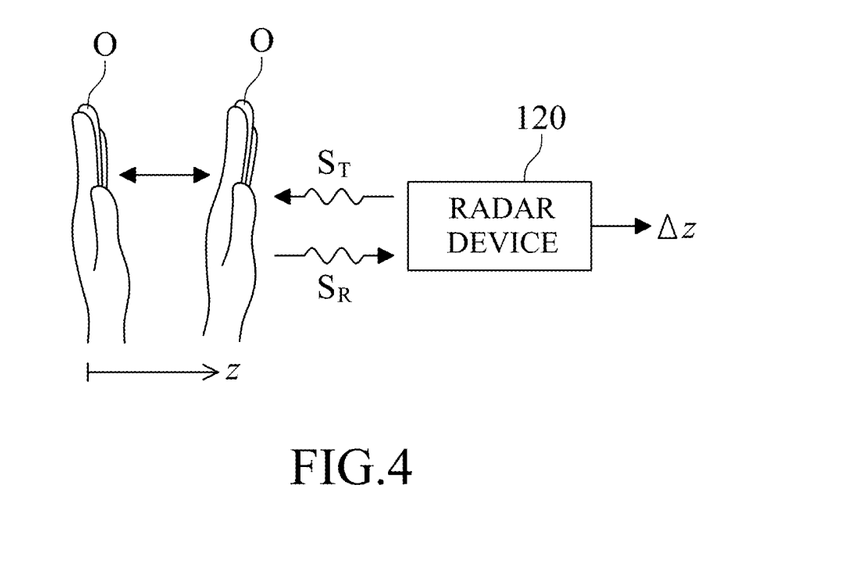
FIG. 4 is a schematic diagram illustrating a radar device detecting a moving object in accordance with one embodiment of the present invention.

With reference to FIGS. 1 and 4, the radar device 120 is a passive radar without owning an RF signal source in this embodiment. However, it can be an active radar with its own RF signal source in other embodiments. In FIG. 4, the radar device 120 is configured to transmit an input wireless signal $S_T$ to a moving object O and receive a reflection signal $S_R$ from the moving object O. And the moving object O represents the same moving object as that in the moving object image $O_P$. The reflection signal $S_R$ contains the Doppler shift associated with the z-direction (longitudinal) displacement of the moving object O, so the radar device 120 can detect a z-direction displacement $\Delta z$ of the moving object O from the reflection signal $S_R$. Preferably, the radar device 120 is a passive radar when the 3-D path detection system 100 of the present invention is applied to a mobile phone, because the passive radar possesses the benefits of both lower power consumption and less interference.

Figure 5:
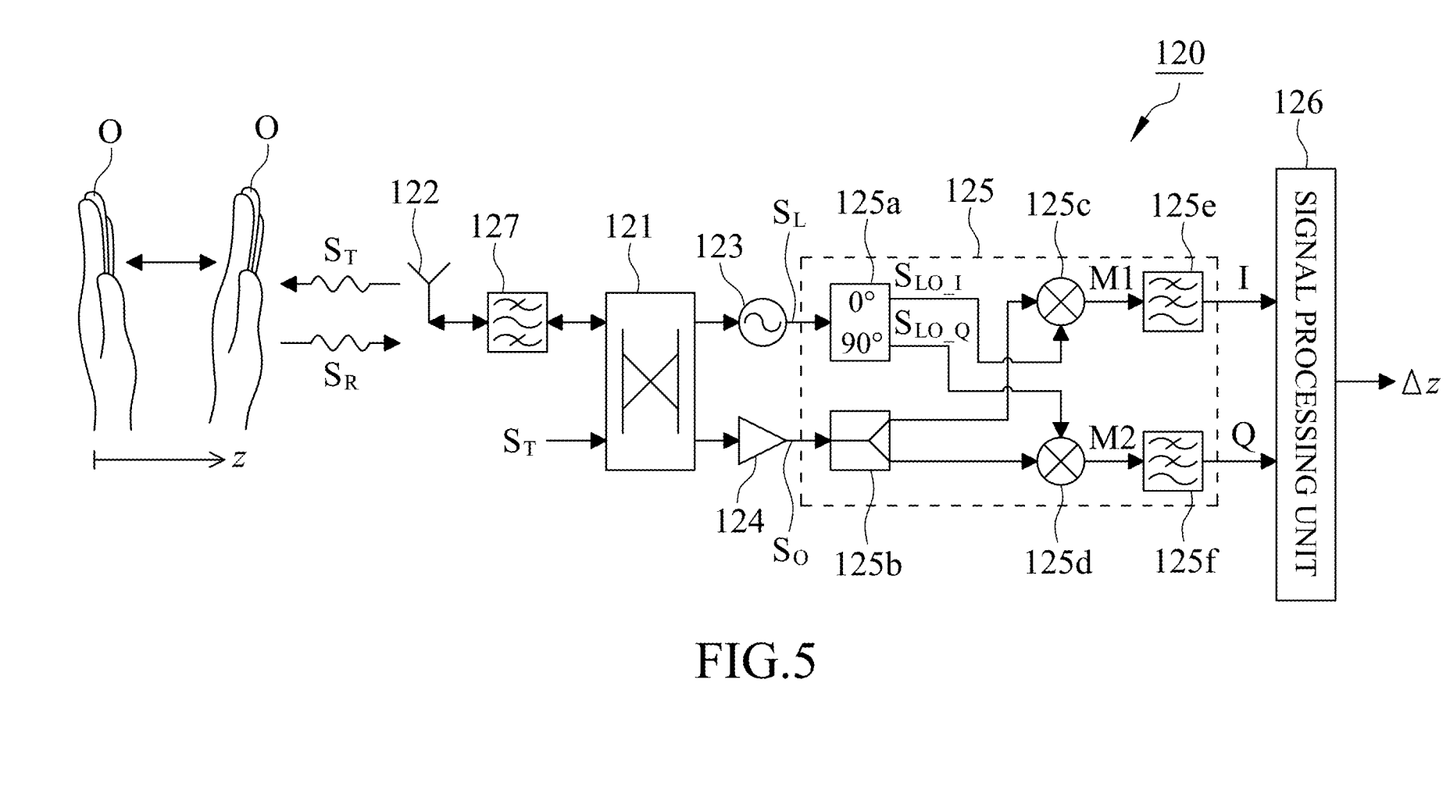
FIG. 5 is a circuit diagram illustrating the radar device in accordance with one embodiment of the present invention.

With reference to FIG. 5, the radar device 120 includes a coupler 121, an antenna 122, an injection-locked oscillator (ILO) 123, an amplifier 124, a demodulation circuit 125, a signal processing unit 126 and a bandpass filter 127.

With reference to FIG. 5, the input wireless signal $S_T$ is fed to the coupler 121 of the radar device 120, and the input wireless signal $S_T$ comes from a wireless communication device. In this embodiment, the input wireless signal $S_T$ is a Wi-Fi signal from a Wi-Fi access point, and the coupler 121 is a branch-line coupler. The coupler 121 couples the input wireless signal $S_T$ to the ILO 123, allowing the ILO 123 to operate in an injection-locked state and output a lock-in signal $S_L$. The input wireless signal $S_T$ is also coupled to the bandpass filter 127 for out-of-band rejection and then delivered to the antenna 122. The antenna 122 radiates the input wireless signal $S_T$ to the moving object O and receives the reflection signal $S_R$ from the moving object O with the Doppler shift associated with the z-direction displacement of the moving object O. The reflection signal $S_R$ received by the antenna 122 is delivered to the bandpass filter 127 and then coupled to the amplifier 124 via the coupler 121. The demodulation circuit 125 is coupled to the ILO 123 and the amplifier 124 and utilized to quadrature demodulate an amplified RF signal $S_O$ output from the amplifier 124 using the lock-in signal $S_L$ output from the ILO 123.

With reference to FIG. 5, the demodulation circuit 125 is a quadrature demodulator in this embodiment. The demodulation circuit 125 includes a quadrature power splitter 125a, a power splitter 125b, a first mixer 125c, a second mixer 125d, a first low-pass filter 125e and a second low-pass filter 125f. The quadrature power splitter 125a is coupled to the ILO 123 for receiving the lock-in signal $S_L$, and the quadrature power splitter 125a outputs an in-phase local oscillation signal $S_{LO\_I}$ via a 0° output port and outputs a quadrature local oscillation signal $S_{LO\_Q}$ via a 90° output port. The power splitter 125b is coupled to the amplifier 124 for splitting the amplified RF signal $S_O$ into two paths. The first mixer 125c is utilized to receive and mix the in-phase local oscillation signal $S_{LO\_I}$ and the amplified RF signal $S_O$ in one path for producing a first mixer output signal M1. The second mixer 125d is utilized to receive and mix the quadrature local oscillation signal $S_{LO\_Q}$ and the amplified RF signal $S_O$ in the other path for producing a second mixer output signal M2. The first low-pass filter 125e is arranged to receive and filter the first mixer output signal M1 from the first mixer 125c to obtain an in-phase signal I, and the second low-pass filter 125f is arranged to receive and filter the second mixer output signal M2 from the second mixer 125d to obtain a quadrature signal Q. The signal processing unit 126 is coupled to the demodulation circuit 125 for receiving and processing the in-phase signal I and the quadrature signal Q to obtain the z-direction displacement $\Delta z$ of the moving object O based on the detection of the Doppler shift using an arctangent calculation method.

Figure 6:
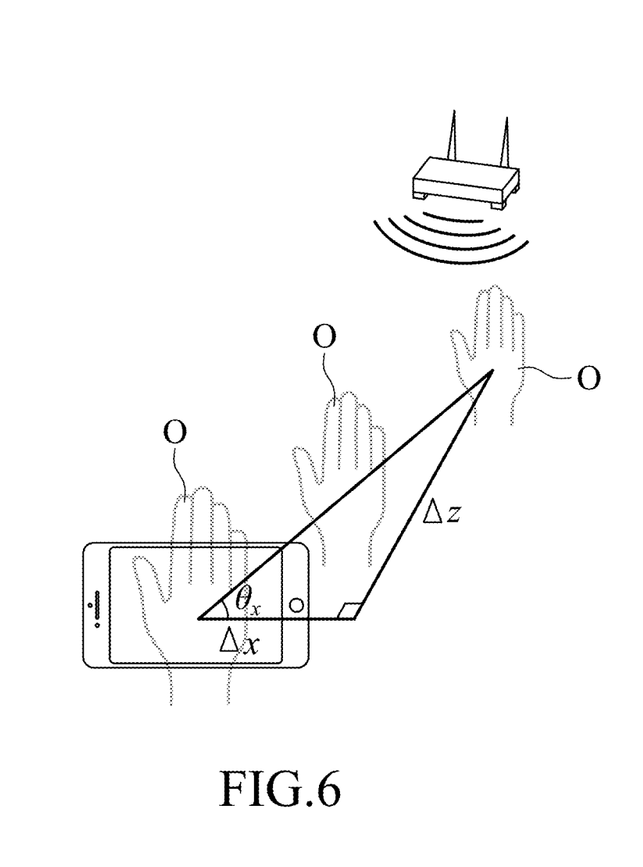
FIG. 6 is a schematic diagram illustrating the moving object along a straight path in the xz plane with a predetermined angle relative to x-axis in accordance with one embodiment of the present invention.
Figure 7:
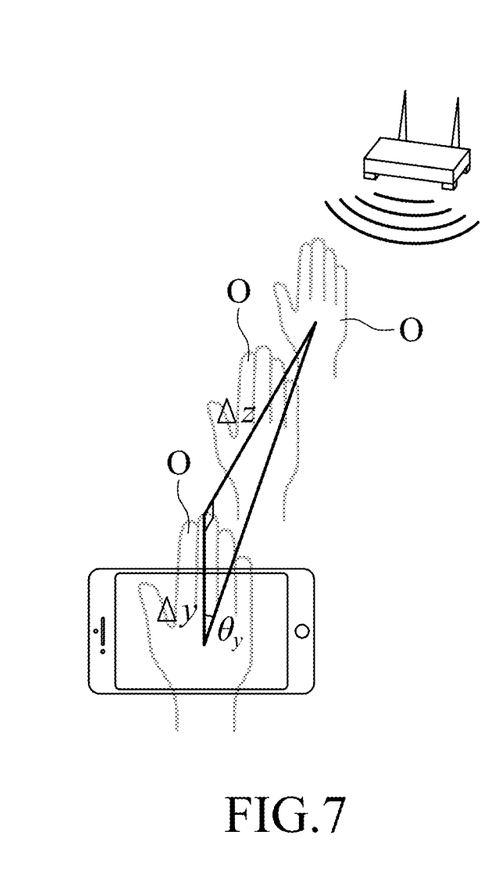
FIG. 7 is a schematic diagram illustrating the moving object along a straight path in the yz plane with a predetermined angle relative to y-axis in accordance with one embodiment of the present invention.

With reference to FIG. 1, the computing module 130 is coupled to the image capture device 110 and the radar device 120, and required to perform a calibration procedure prior to constructing a 3-D path T. In the calibration procedure, as FIGS. 6 and 7 show, the moving object O moves along a straight path in the xz plane with a first angle $\theta_x$ relative to x-axis, and then moves along a straight path in the yz plane with a second angle $\theta_y$ relative to y-axis. And the first and second angles $\theta_x$ and $\theta_y$ are the predetermined angles. According to the x- and y-direction pixel-value displacements $\Delta P_x$ and $\Delta P_y$ of the moving object image $O_P$ and the z-direction displacement $\Delta z$ of the moving object O that are obtained by the image capture device 110 and the radar device 120, respectively, in the calibration procedure, the computing module 130 can calculate a first conversion coefficient $m_x$ from the x-direction pixel-value displacement $\Delta P_x$ to an x-direction displacement $\Delta x$ and a second conversion coefficient $m_y$ from the y-direction pixel-value displacement $\Delta P_y$ to a y-direction displacement $\Delta y$ for use in constructing the 3-D path T of the moving object O. The calculation formulas of the first and second conversion coefficients $m_x$ and $m_y$ are given as follows:

$$m_x = \frac{\Delta x (\text{cm})}{\Delta P_x (\text{pixel})} = \frac{\Delta z (\text{cm})}{\Delta P_x (\text{pixel}) \times \tan\theta_x}$$

$$m_y = \frac{\Delta y (\text{cm})}{\Delta P_y (\text{pixel})} = \frac{\Delta z (\text{cm})}{\Delta P_y (\text{pixel}) \times \tan\theta_y}$$

For an arbitrary movement of the moving object O, the 3-D path detection system 100 of the present invention utilizes the image capture device 110 to provide the x- and y-direction pixel-value displacements $\Delta P_x$ and $\Delta P_y$ of the moving object image $O_P$, utilizes the radar device 120 to provide the z-direction displacement $\Delta z$ of the moving object O, and utilizes the computing module 130 to convert the x- and y-direction pixel-value displacements $\Delta P_x$ and $\Delta P_y$ of the moving object image $O_P$ into the x- and y-direction displacements $\Delta x$ and $\Delta y$ of the moving object O using the first and second conversion coefficients $m_x$ and $m_y$ established through the calibration procedure. Accordingly, the computing module 130 can further construct the 3-D path T of the moving object O according to the obtained x-, y- and z-direction displacements $\Delta x$, $\Delta y$ and $\Delta z$.

In this embodiment, the radar device 120 is a passive radar which does not have its own RF signal source but uses the Wi-Fi signal to detect the z-direction displacement of the moving object. Therefore, the radar device 120 has the advantage of low power consumption and will not interfere with wireless communications of the mobile phone. In addition, the radar device using the Wi-Fi signal to detect the moving object will not be affected by the ambient light. For these reasons, the 3-D path detection system 100 of the present invention can improve the popularity of HGR application in mobile phones.

Figure 8:
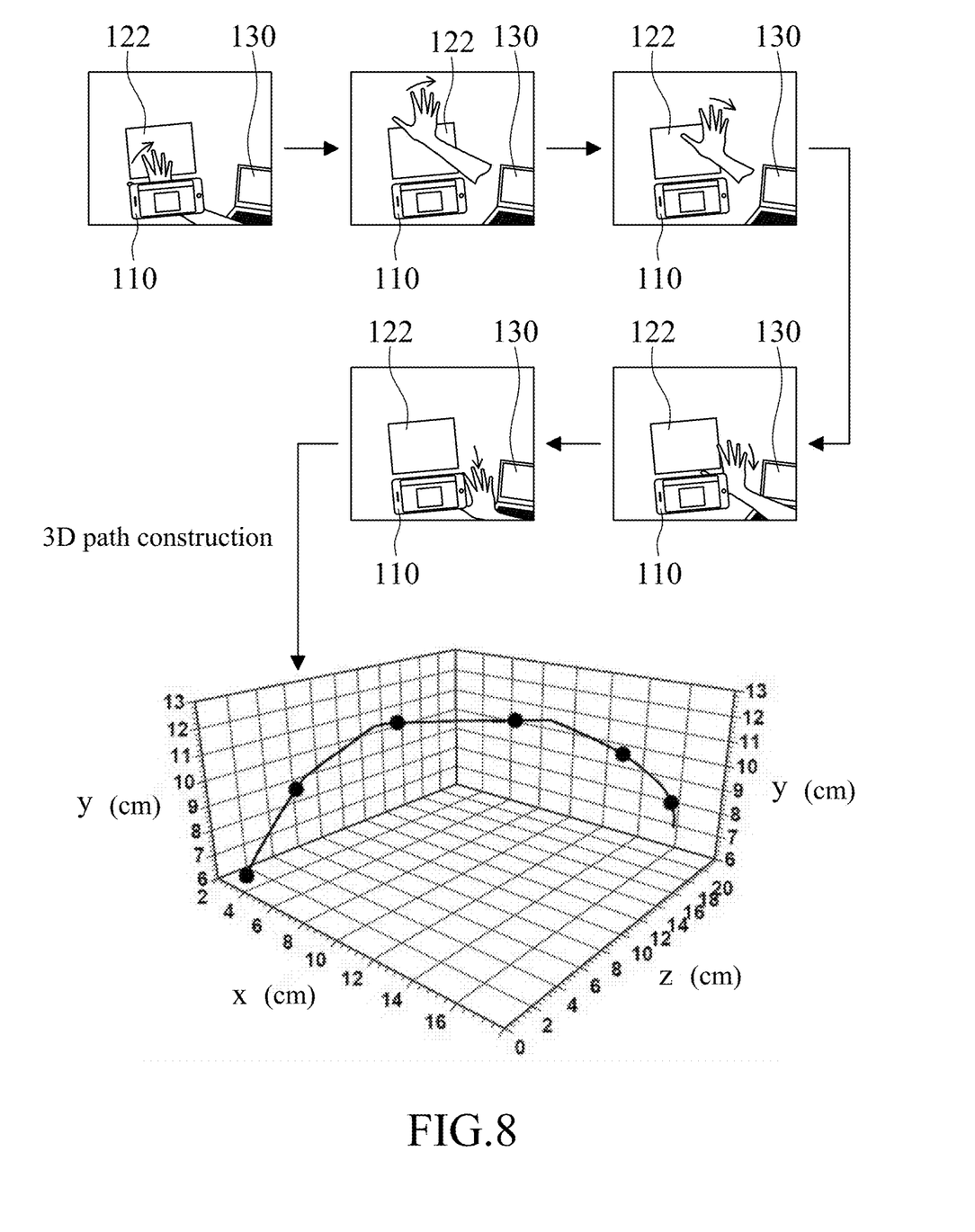
FIG. 8 is a schematic diagram illustrating the 3-D path detection system constructing the 3-D path of one hand gesture in accordance with one embodiment of the present invention.
Figure 9:
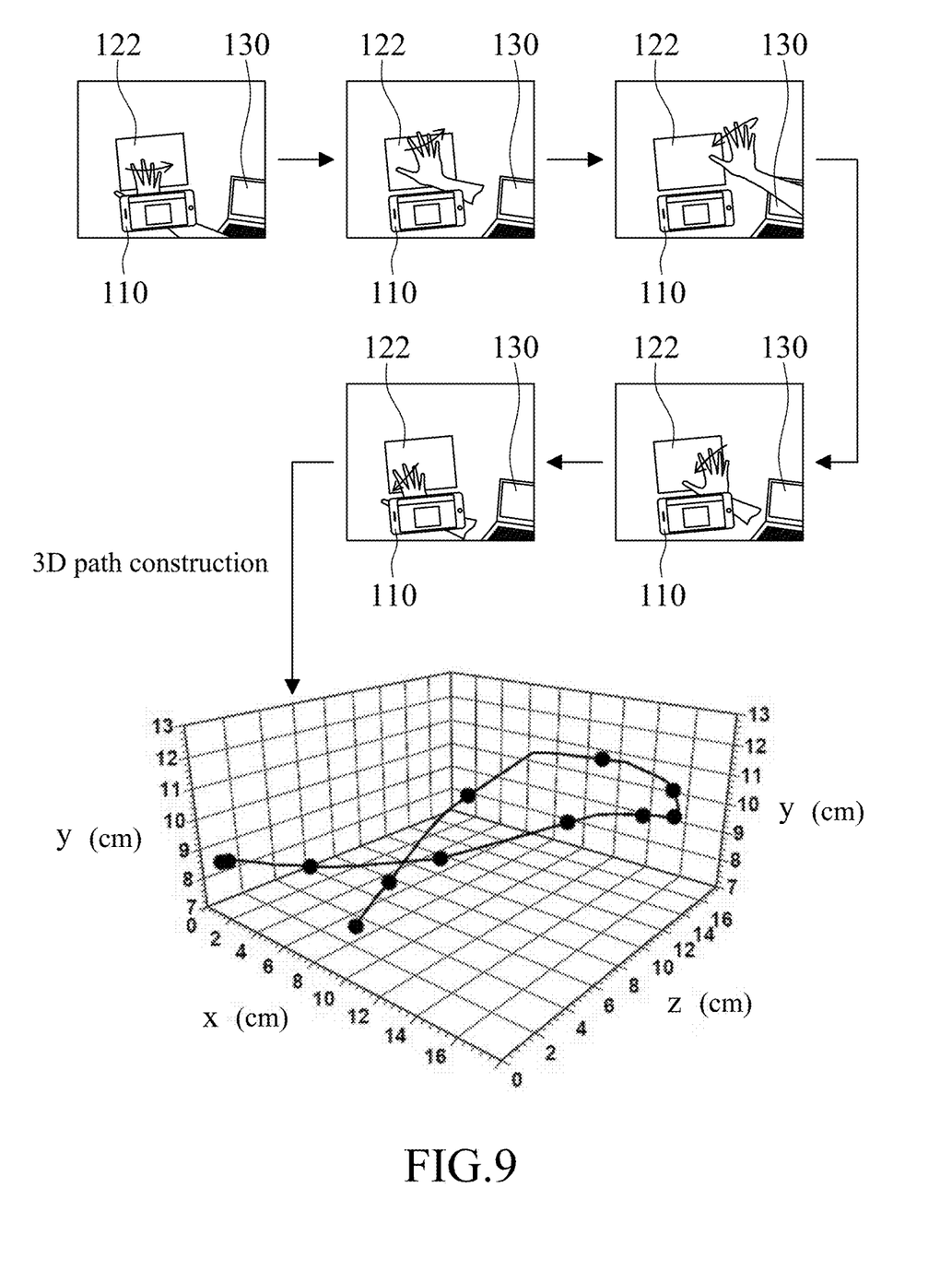
FIG. 9 is a schematic diagram illustrating the 3-D path detection system constructing the 3-D path of another hand gesture in accordance with one embodiment of the present invention.

With reference to FIGS. 8 and 9, the 3-D path detection system 100 of the present invention is provided to construct the 3-D paths of two hand gestures. In more details, the image capture device 110 is a mobile phone, the radar device 120 is a passive radar (not shown), the antenna 122 of the radar device 120 is a planar antenna, the computing module 130 is a laptop, and the image capture device 110 and the radar device 120 are coupled to the computing module 130. Referring FIG. 8, a user holds the image capture device 110 in his left hand and moves his right hand right up and then right down, in forward motion (away from the image capture device 110 gradually). Referring FIG. 9, the user holds the image capture device 110 in his left hand and moves his right hand right forward (away from the image capture device 110 gradually), turns the hand back and then moves it left backward (close to the image capture device 110 gradually). In FIGS. 8 and 9, the 3-D paths constructed by the 3-D path detection system 100 are similar to the actual hand gestures of the user, demonstrating that the 3-D path detection system 100 of the present invention that combines the computer vision and Doppler radar technologies can be utilized to construct the 3-D path of hand gestures.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A 3-D path detection system comprising:
an image capture device configured to produce a dynamic image, wherein the dynamic image involves a moving object image, and the image capture device is configured to calculate an x-direction (transverse horizontal) pixel-value displacement and a y-direction (transverse vertical) pixel-value displacement of the moving object image;
a radar device configured to transmit an input wireless signal to a moving object, receive a reflection signal from the moving object and obtain a z-direction (longitudinal) displacement of the moving object according to a Doppler shift in the reflection signal; and
a computing module coupled to the image capture device and the radar device, wherein the computing module is configured to perform a calibration procedure to convert the x- and y-direction pixel-value displacements into a x-direction displacement and a y-direction displacement by relating to the z-direction displacement, and the computing module is configured to construct a 3-D path of the moving object by using the x- and z-direction displacements of the moving object;
wherein the calibration procedure is: the moving object moves along a straight path in the xz plane with a first angle relative to x-axis and then moves along a straight path in the yz plane with a second angle relative to y-axis, and the first and second angles are the predetermined angles, wherein according to the x- and y-direction pixel-value displacements of the moving object image and the z-direction displacement of the moving object, the computing module is configured to calculate a first conversion coefficient from the x-direction pixel-value displacement of the moving object image to an x-direction displacement of the moving object and calculate a second conversion coefficient from the y-direction pixel-value displacement of the moving object image to a y-direction displacement of the moving object, and the calculation formulas of the first and second conversion coefficients are represented as follows:

$$m_x = \frac{\Delta x (\text{cm})}{\Delta P_x (\text{pixel})} = \frac{\Delta z (\text{cm})}{\Delta P_x (\text{pixel}) \times \tan\theta_x}$$

$$m_y = \frac{\Delta y (\text{cm})}{\Delta P_y (\text{pixel})} = \frac{\Delta z (\text{cm})}{\Delta P_y (\text{pixel}) \times \tan\theta_y}$$

wherein $m_x$ is the first conversion coefficient, $\Delta z$ is the z-direction displacement of the moving object, $\Delta P_x$ is the x-direction pixel-value displacement of the moving object image, $\theta_x$ is the first angle, $\Delta x$ is the x-direction displacement of the moving object, $m_y$ is the second conversion coefficient, $\Delta P_y$ is the y-direction pixel-value displacement of the moving object image, $\theta_y$ is the second angle, and $\Delta y$ is the y-direction displacement of the moving object.

2. The 3-D path detection system in accordance with claim 1, wherein the image capture device is configured to calculate the x- and y-direction pixel-value displacements of the moving object image by preforming a background subtraction.

3. The 3-D path detection system in accordance with claim 2, wherein the image capture device is configured to establish a background model related to the dynamic image, and is configured to compare the differences in pixels between the dynamic image and the background model to capture the moving object image.

4. The 3-D path detection system in accordance with claim 1, wherein the radar device is a passive radar.

5. The 3-D path detection system in accordance with claim 4, wherein the radar device includes a coupler, an antenna, an injection-locked oscillator (ILO), an amplifier and a demodulation circuit, wherein the coupler is configured to receive and couple the input wireless signal to the antenna and the ILO, allowing the ILO to operate in an injection-locked state and output a lock-in signal, wherein the antenna is configured to transmit the input wireless signal to the moving object and receive a reflection signal from the moving object, wherein the coupler is then configured to receive and couple the reflection signal to the amplifier, and wherein the demodulation circuit is coupled to the ILO and the amplifier and is configured to quadrature demodulate an amplified RF signal output from the amplifier using the lock-in signal output from the ILO.

6. The 3-D path detection system in accordance with claim 5, wherein the radar device further includes a signal processing unit, wherein the signal processing unit is coupled to the demodulation circuit for receiving an in-phase signal and a quadrature signal and is configured to calculate the z-direction displacement of the moving object according to the in-phase and quadrature signals.

7. The 3-D path detection system in accordance with claim 5, wherein the demodulation circuit includes a quadrature power splitter, a power splitter, a first mixer, a second mixer, a first low-pass filter and a second low-pass filter, wherein the quadrature power splitter is coupled to the ILO for receiving the lock-in signal and is configured to output an in-phase local oscillation signal and a quadrature local oscillation signal, wherein the power splitter is coupled to the amplifier for receiving the amplified RF signal and is configured to split the amplified RF signal into two paths, wherein the first mixer is configured to receive and mix the in-phase local oscillation signal and the amplified RF signal in one path, and the second mixer is configured to receive and mix the quadrature local oscillation signal and the amplified RF signal in the other path, wherein the first low-pass filter is configured to receive and filter a first mixer output signal from the first mixer to obtain the in-phase signal, and the second low-pass filter is configured to receive and filter a second mixer output signal from the second mixer to obtain the quadrature signal.

8. The 3-D path detection system in accordance with claim 1, wherein the image capture device, the radar device and the computing module are integrated in a mobile phone.

9. The 3-D path detection system in accordance with claim 1, wherein the input wireless signal comes from a wireless communication device.

10. A 3-D path detection system comprising:
   an image capture device configured to produce a dynamic image, wherein the dynamic image involves a moving object image, and the image capture device is configured to calculate an x-direction (transverse horizontal) pixel-value displacement and a y-direction (transverse vertical) pixel-value displacement of the moving object image;
   a radar device configured to transmit an input wireless signal to a moving object, receive a reflection signal from the moving object and obtain a z-direction (longitudinal) displacement of the moving object according to a Doppler shift in the reflection signal, wherein the radar device is a passive radar; and
   a computing module coupled to the image capture device and the radar device, wherein the computing module is configured to construct a 3-D path of the moving object by using the x- and y-direction pixel-value displacements of the moving object image and the z-direction displacement of the moving object;
   wherein the radar device includes a coupler, an antenna, an injection-locked oscillator (ILO), an amplifier, a demodulation circuit and a signal processing unit, wherein the coupler is configured to receive and couple the input wireless signal to the antenna and the ILO, allowing the ILO to operate in an injection-locked state and output a lock-in signal, wherein the antenna is configured to transmit the input wireless signal to the moving object and receive a reflection signal from the moving object, wherein the coupler is then configured to receive and couple the reflection signal to the amplifier, and wherein the demodulation circuit is coupled to the ILO and the amplifier and is configured to quadrature demodulate an amplified RF signal output from the amplifier using the lock-in signal output from the ILO, wherein the signal processing unit is coupled to the demodulation circuit for receiving an in-phase signal and a quadrature signal and is configured to calculate the z-direction displacement of the moving object according to the in-phase and quadrature signals.

* * * * *